Patented Oct. 17, 1922.

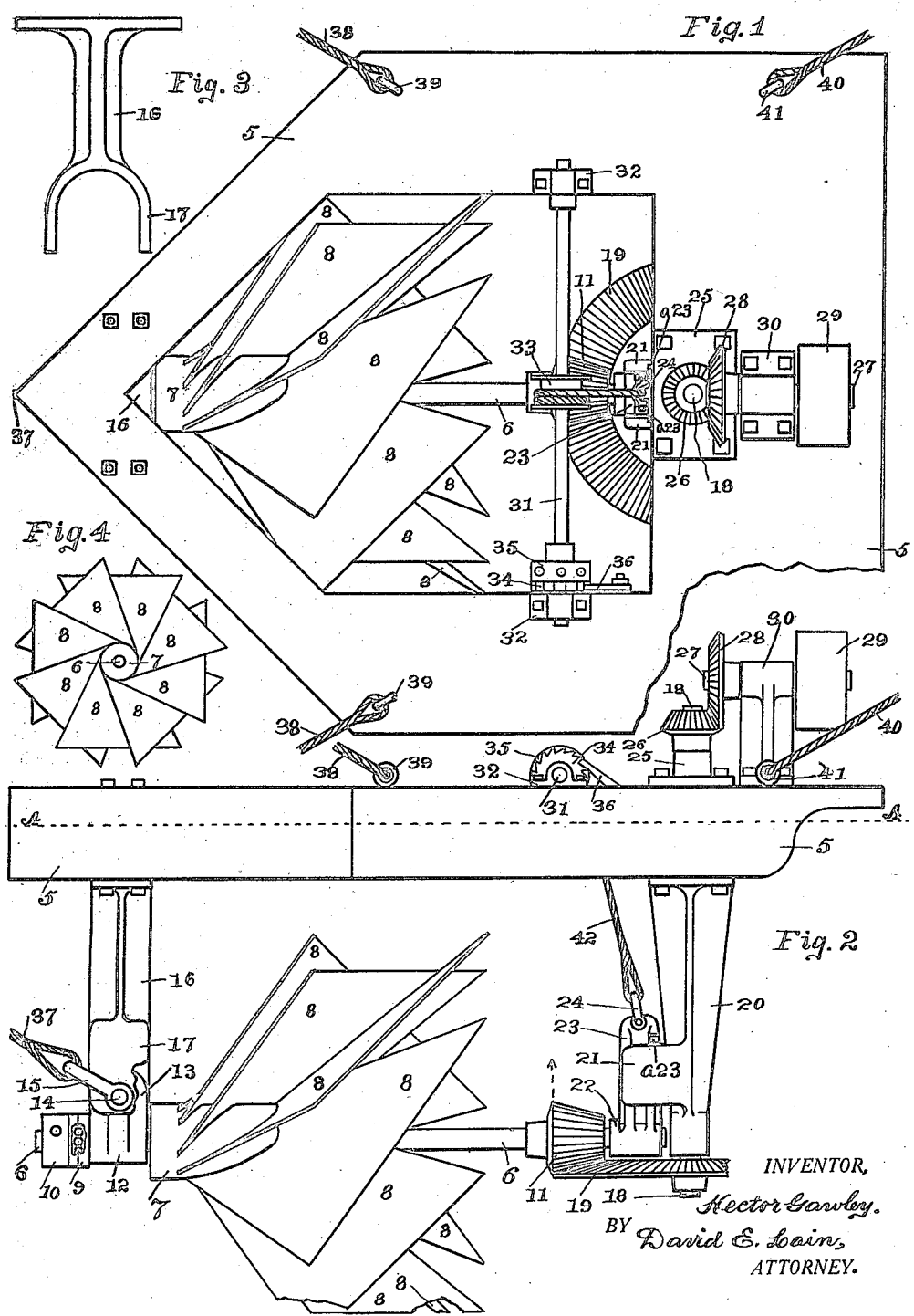

1,432,327

UNITED STATES PATENT OFFICE.

HECTOR GAWLEY, OF BELLINGHAM, WASHINGTON.

WATER-CURRENT POWER WHEEL.

Application filed April 6, 1922. Serial No. 550,143.

*To all whom it may concern:*

Be it known that I, HECTOR GAWLEY, a citizen of the United States, residing at Bellingham, in the county of Whatcom and State of Washington, have invented a new and Useful Water-Current Power Wheel, of which the following is a specification.

My invention relates to improvements in water current power wheels, more especially those used to obtain power from rivers, and one of the objects of my improvements is to provide a water wheel which will absorb maximum power from the moving water with minimum disturbance to its flow. Another object of my improvements is to provide a water wheel shaped to deflect drifting objects without becoming entangled therewith. Another object of my improvements is to provide a simple method of disconnecting the prime mover shaft from the power shaft. And a further object of my improvements is to provide a strong and simple construction the wearing parts of which are not expensive.

I attain these objects with the mechanism illustrated in the accompanying sheet of drawings, forming a part of this specification, in which Figure 1 is a plan view of my water wheel mounted on a float, Fig. 2 is a side elevation of Fig. 1, Fig. 3 is a front elevation of the front bearing bracket shown by itself, and Fig. 4 is a front elevation of my water wheel, shown by itself and drawn on a smaller scale.

Similar characters refer to similar parts throughout. Certain parts are broken away for lack of space or to show others hidden thereby.

More particularly: A float 5 has a wedgeform bow which is faced up stream, and a large central opening. A water wheel shaft 6 has a fixed hub 7 into which have been molded and cast wheel paddles 8. The shank end of paddles 8 is narrower than their blade end and each is set in hub 7 inclined to the axis thereof and also slanting backward and outward in a manner to bring the forward edges of said paddles in the surface of a cone concentric with shaft 6. By preference I use cast iron for hub 7 and shell steel for paddles 8. I also prefer to make the shanks of paddles 8 convex toward the rear, but they are shown as plane in the illustrations. On the forward end of shaft 6 is mounted ball thrust bearing 9 behind set collar 10. On the rear end of shaft 6 is fixed bevel spur gear 11. The front end of shaft 6 is mounted for revolution in bearing 12 on the upper side of which is lug 13 which is mounted for oscillation in bracket yoke 17 on pin 14. Bracket 16, which terminates below in yoke 17, is fastened to the front end of float 5 on its bottom and is pendent beneath the same. Thrust bearing 9 is between ring 10 and bearing 12. A vertical power shaft 18 is mounted for revolution in a bearing on the lower end of bracket 20 and bearing 25, and bears fixed on its lower end bevel spur gear 19 meshed with gear 11. Two guide lugs 21 project forward from the lower end of bracket 20 and guide vertical slide 23 which is a lug projecting upward from bearing 22 in which the rear end of shaft 6 is mounted for revolution. Stops $a^{23}$ project laterally from lug 23 and bear on top of guides 21 when gears 11 and 19 are properly engaged. A clevis 24 is pivoted to the upper end of lug 23. Bracket 20 is fastened to the bottom of the stern of float 5 and projects downward. Vertically above bracket 20 bearing 25 is fastened to the top side of float 5. Bevel spur gear 26 is fixed on the upper end of power shaft 18. Horizontal power shaft 27 is mounted for revolution in bearing bracket 30, which is fastened to the top of float 5, and has fixed on one end spur bevel gear 28 meshed with gear 26, and has fixed on its other end power pulley 29. Lifting shaft 31 is mounted on the top of float 5 for revolution in bearings 32 fastened to said float. Drum 33 is fixed centrally on shaft 31. Ratchet wheel 34 and turret flange 35 are fixed on one end of shaft 31. Ratchet dog 36 is pivoted to the float and is engaged with ratchet 34. Bow cable 37 is engaged with shackle 15, and bow cables 38 are engaged with eye bolts 39 which are fastened to the top of float 5. Stern cables 40 are engaged in eye bolts 41 which are fastened to said float. Float 5 is retained in the desired position in the stream by said cables 37, 38 and 40 the other ends of which are fastened to suitable anchorages. An eye in the lower end of lifting cable 42 is engaged with shackle 24, and the upper end of said cable is fastened to drum 33. Dotted line A—A in Fig. 2 is assumed to indicate the surface of the water on which my float rests.

In operation: Drift floating on the surface of the stream is deflected by the sharp bow of float 5 and passes without touching wheel 8. Drift borne along beneath the surface is turned to either side by bow cable 37 and bracket 16 but may come in contact with blades 8 after passing these obstructions. However, because the blades revolve, because they are rearwardly inclined and also because the current is deflected diagonally outward and rearward by contacting with slanting blades 8, such drift has little chance to become entangled in said blades. Water passing beneath the float from the bow sternward will be deflected by blades 8 and some of its momentum will be transfered to said blades as a moment to cause the revolution of shaft 6 in a clockwise direction. These revolutions, through gears 11 and 19, shaft 18, gears 26 and 28, and shaft 27, will cause power pulley 29 to revolve. When it is desired to throw shaft 6 out of power connection with pulley 29 a bar is inserted in the sockets of turret 35 and used to revolve shaft 31 which takes up cable 42 on drum 33, thus lifting gear 11 out of mesh with gear 19 and breaking said power connections. Meanwhile dog 36 in ratchet 34 retains shaft 31 in any desired position in rotation. To cause the resumption of power connections, by means of said bar in said turret pressure is removed from dog 36 when it is disengaged and gear 11 allowed to drop back in engagement. Power from pulley 29 can be transmitted to pumps, electric generators, and the like, located on said float as desired.

Having thus disclosed my invention, what I claim as new and desire to secure by Letters Patent is,—

In a stream water motor in combination, a float, a bow and a stern bracket fastened to said float and pendant beneath the same, said bow bracket adapted for pivotal connection to a shaft bearing and said stern bracket having a vertical guide way, a forward shaft bearing pivoted to said bow bracket for oscillation on said pivot, a rear shaft bearing adapted to slide in said guide way in said stern bracket, a water-wheel shaft mounted for revolution in said forward and rear bearings, inclined paddles fixed to said water-wheel shaft, whereby said shaft is revolved by the current of said stream, a power shaft mounted in bearings on said float, power conections between said water-wheel shaft and said power shaft, and means adapted to oscillate said water-wheel shaft on said bearing pivot whereby said power connections are interrupted and restored as desired.

HECTOR GAWLEY.